United States Patent [19]

Judeinstein et al.

[11] Patent Number: 4,956,841
[45] Date of Patent: Sep. 11, 1990

[54] METHOD AND DEVICE FOR SWITCHING A PACKET OF DATA

[75] Inventors: André Judeinstein, Remy-Les Chevreuses; Laurent Fevrier, Paris, both of France

[73] Assignee: LMT Radioprofessionnelle, Boulogne Billancourt, France

[21] Appl. No.: 293,418

[22] Filed: Jan. 4, 1989

[30] Foreign Application Priority Data

Jan. 8, 1988 [FR] France ............................ 88 00139

[51] Int. Cl.⁵ .................................................. H04J 3/24
[52] U.S. Cl. .................................. 370/94.1; 370/60.1
[58] Field of Search .................... 370/60, 94, 85, 86, 370/88, 60.1, 94.1, 85.1, 85.12, 85.13, 85.15, 94.3, 95.1

[56] References Cited

U.S. PATENT DOCUMENTS

| | | | |
|---|---|---|---|
| 4,701,906 | 10/1987 | Ransom et al. | 370/94 |
| 4,734,907 | 3/1988 | Turner | 370/60 |
| 4,792,942 | 12/1988 | Osato | 370/60 |
| 4,818,984 | 4/1989 | Chang et al. | 370/94 |
| 4,829,227 | 5/1989 | Turner | 370/94 |

FOREIGN PATENT DOCUMENTS 0006798 1/1980 European Pat. Off. .
2093211 1/1972 France .

OTHER PUBLICATIONS

Proceedings of the Ninth Data Communications Symposium, Sep. 10-13, 1985, pp. 172-179, IEEE, D. R. Cheriton et al.

Primary Examiner—Douglas W. Olms
Assistant Examiner—Wellington Chin
Attorney, Agent, or Firm—Oblon, Spivak, McClelland, Maier & Neustadt

[57] ABSTRACT

The invention relates to the sending, by a sender, of messages, by means of arrowed packages, in a communications network comprising switch nodes. The packet is prepared by the sender so as to travel over a path that successively takes it to all the nodes where there are subscribers for whom the message contained in the packet is intended. Upon arrival in a node of this type, an arrow, followed by instructions and placed just after the arrow which has enabled the packet to reach the node considered, designates a transmission server which, depending on the instructions, performs the local transmission of the message and enables the packet to continue its path. The arrows and the instructions are removed from the packet, in the course of the path, as soon as they have finished serving their purpose.

3 Claims, 7 Drawing Sheets

FIG. 3a
FIG. 3b
FIG. 3c
FIG. 3d
FIG. 3e
FIG. 3f
FIG. 3g
FIG. 3h

METHOD AND DEVICE FOR SWITCHING A PACKET OF DATA

BACKGROUND OF THE INVENTION

1. Field of the Invention

The present invention concerns a method and device for the switching of a packet between a transmitter and receivers.

It should be noted that, hereinafter, the term 'subscriber' will be often used in preference to the term 'receiver' and the term "addressee" will represent a subscriber designated to receive a message contained in the packet.

This document makes use of the notions of the "main trunk route", arrows and arrowed packets (also called self-routing datagrams) in the field of packet transmission. In the rest of this document, including the claims, the term "transmission" implies both the transmission and the distribution of data.

A transmission of data is said to be done by a main trunk route or along a main trunk route when the transmission of data is done in travelling along a path with branching out points on this path, where the data are transmitted and distributed locally.

An arrow is a code number placed in a packet and used, for example, by a switch to direct the packet towards one of its outputs: this arrow is "plucked out", i.e. withdrawn from the packet as soon it has been used. Packets provided with arrows, also called arrowed packets, have been designed to achieve a point-to-point link, i.e. a link between a transmitter and a single receiver; the arrows with which the packet is provided when it is prepared indicate the path to be followed, in the network, between the transmitter and the receiver. The arrowed packet method enables very fast switching, and therefore lends itself to every type of application such as telephony, real time data transmission, etc. Packets of this type are used in the European patent application No. 0006798.

Until now, owing to the very fact of their initial design, arrowed packets have not been used for transmission to a large number of addressees since, as noted above, they were planned only for point-to-point links.

SUMMARY OF THE INVENTION

An aim of the present invention is to propose a method for the fast switching of a data packet between a transmitter and several receivers or addressees, without causing heavy traffic in the arteries as in the case where communications sent to different addressees are established independently of one another but are transmitted simultaneously.

This is obtained by using arrowed packets of a new design.

According to the invention, there is provided a method for the switching of a data packet along a main trunk route of a communications network, comprising switch nodes, wherein said method uses an arrowed packet comprising ordinary node-to-node guiding arrows and consists in effecting, from certain nodes of the main trunk route, a local transmission of data towards addressees and, for this purpose, in placing, in the packet, after each of the ordinary arrows which make the packet reach a node where a local transmission of data towards the addressees has to be made, another arrow and pieces of information, said other arrow designating a transmission server proper to the node to which the packet was made to reach by the ordinary arrow preceding the other arrow considered, and said pieces of information being of three types: a designation of a zone of the server containing a list of addressees, data to be sent to the addressees and a protocol for the use of this data.

BRIEF DESCRIPTION OF THE DRAWINGS

The present invention will be better understood and other features will emerge from the following description and the appended figures, of which:

FIG. 3 shows the successive structures of a first type of arrowed packet according to the invention;

In the different figures, the corresponding elements are designated by the same references.

In the different drawings, the devices used to process the packets, which come under current technology, have not been shown in detail, so as make the drawings clearer and simplify the explanation. However, the processing operations to be made are specified in the explanation.

MORE DETAILED DESCRIPTION

Figure 1:
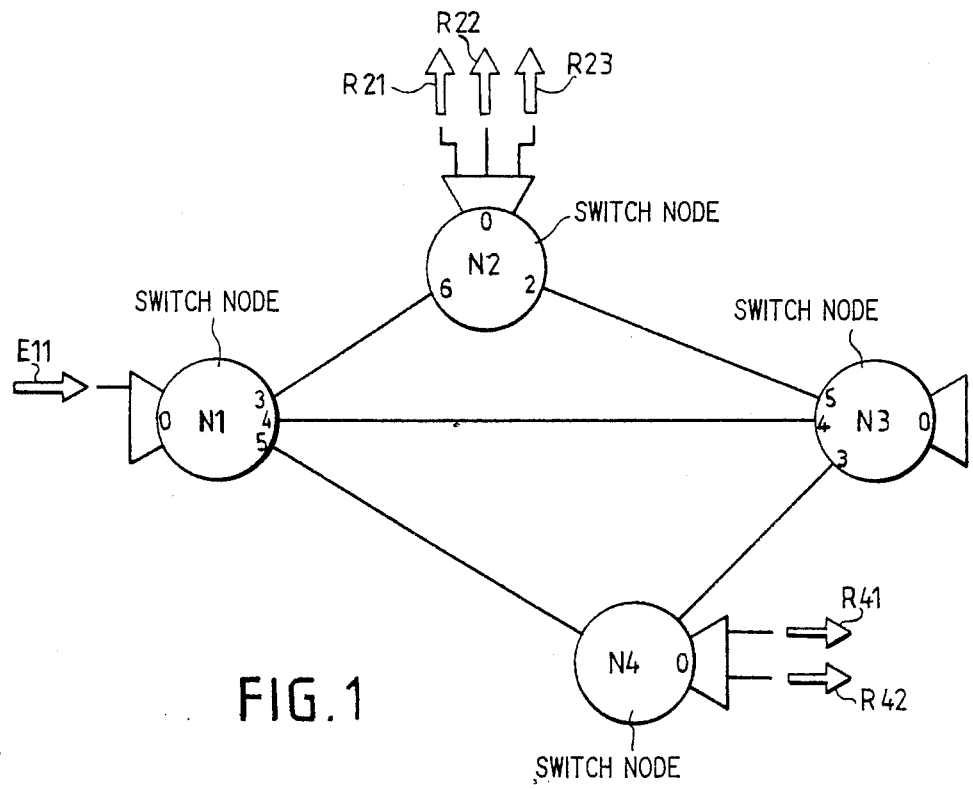
FIG. 1 shows a simplified diagram of a communications network.

FIG. 1 shows a partial view of a network comprising switch nodes, four of which, N1 to N4 appear in the figure. These nodes are interconnected in a meshed structure, by arteries where the communications are multiplexed. The type of multiplexing used does not play a role in the understanding of the invention, and shall therefore not be described in detail. Each switch node has a switch device which, in the examples that will be described, itself has nine connection points for the arteries. Each of these connection points, which are identified by numbers between 0 and 8, has an input and an output. The artery relating to the point 0 is used for the traffic which ends locally in the node, such as traffic by subscribers connected to the node or the signal exchange traffic between the control unit of the node and the control units of neighbouring nodes.

The example described considers a packet sender (or transmitter) Ell, seeking to send one and the same message to three addressees, R21 to R23, associated with the node N2, and two subscribers R41, R42, associated with the node N4. Each of these five subscribers is symbolized by an arrow.

To send its message, the sender 11 could set up five independent communications in turn: this would result in the total period of transmission being lengthy. The sender could also send five messages to the five addressees simultaneously: this assumes that the addressees are simultaneously free and entails the risk of causing heavy traffic in the arteries. To send its message, the sender Ell could also use the services of a switching center, located in the network, which would store the message and retransmit it to the five addressees; the drawback of a center of this type would be very heavy outgoing traffic. To send its message, the sender Ell may also, as shall be described below, use a distributed transmission function wherein the data are conveyed by a main trunk route which interconnects the nodes to which the sender and the addressees are connected; each of the nodes to which one or more addressees are connected provides local transmission, for example, from the node N2 to R21, R22 and R23.

Figure 2:
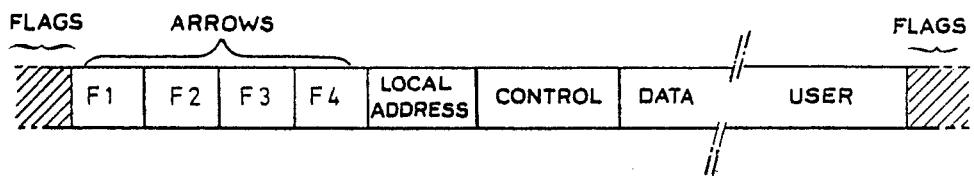
FIG. 2 shows an example of the structure of an arrowed packet according to the prior art.

FIG. 2 shows the known format given to a packet of data for a point-to-point link.

The successive packets are separated by flags formed by the code 01111110. This code can never be encountered outside the flags owing to the insertion, after any group of five consecutive "1" s, of a "0" called a transparency zero, according to the procedure defined by the standard ISO 3309. These "0" s of transparency are eliminated subsequently from the data transmitted between flags.

The packet starts with an addressing field formed by a succession of arrows used to guide the packet from one point to the next one. When the packet enters a switch node, the arrow which is first in line indicates the number of the artery by which it must leave the node. This arrow is "plucked off" by the switch. When the arrow, which is first in line, is at "0", this means that the packet has reached the addressee's node, and the next field then gives his local address.

In a multiservice system, where the final processing undergone by the data depends on the application, a last control field gives the reference of the applicable protocol.

After these header fields, the packet contains user data, complemented if necessary by additional data required by the protocol (order number, frame control sequence, etc.).

This method has the advantage of making it possible to entrust the shunting of the packets to a specific automation, which is therefore very fast, thus making it possible to achieve a very big flow and a very short transit time which is compatible, in particular, with telephone applications.

This method is well suited to making point-to-point links. The following description show how it can be adapted to the making of forked connections, namely connections that have branching out points required for the transmission function.

A first embodiment shall be described with reference to FIGS. 3 to 6, and a second one with reference to FIGS. 6 and FIGS. 7 to 9.

Figures 3A, 3B, 3C, 3D, 3E, 3F, 3G, 3H:
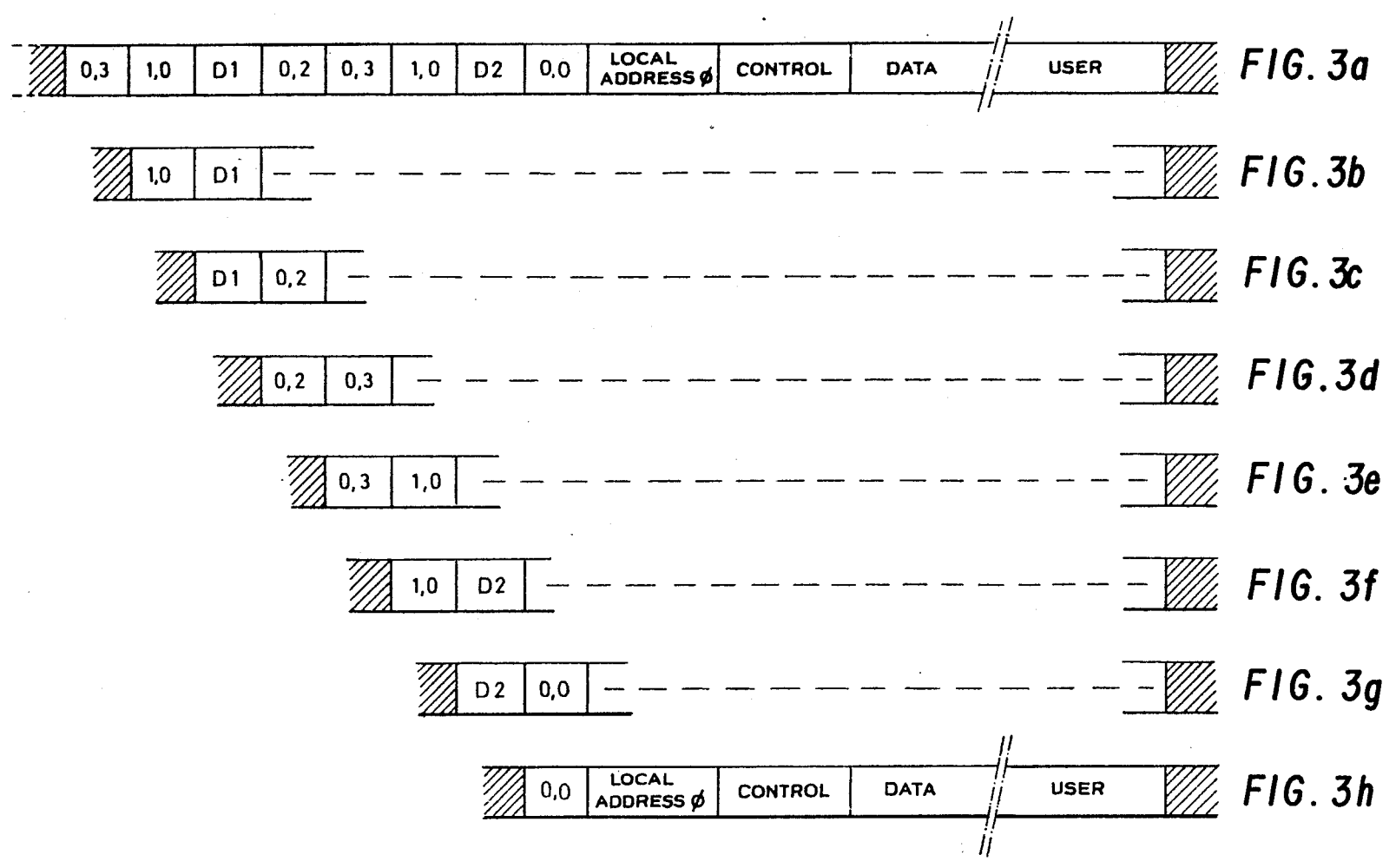

FIG. 3, which is subdivided into FIGS. 3a and 3b, shows the development of a packet especially designed for switching along a main trunk route. In FIGS. 3a to 3h, the flags have been shown by hachured zones.

FIG. 3a shows the packet when it is being created by the sender Ell. It has three categories of arrows in its addressing field:

ordinary arrows used, as in the packets according to FIG. 2, to guide the packet from node to node; in the example described, these arrows have a value ranging between 0 and 7, and their binary representation begins with a zero; in the FIG. 3, these 4-bit arrows are marked "0,3", "0,2", "0,0";

pairs formed by a transmission arrow and a transmission list; in the example described, the transmission arrow designates the connection point number 8, marked "1,0", with which there is connected a transmission server which comprises sixteen sub-servers and shall be described in greater detail below; the transmission list D1(or D2) designates one of the sixteen sub-servers.

Figure 4:
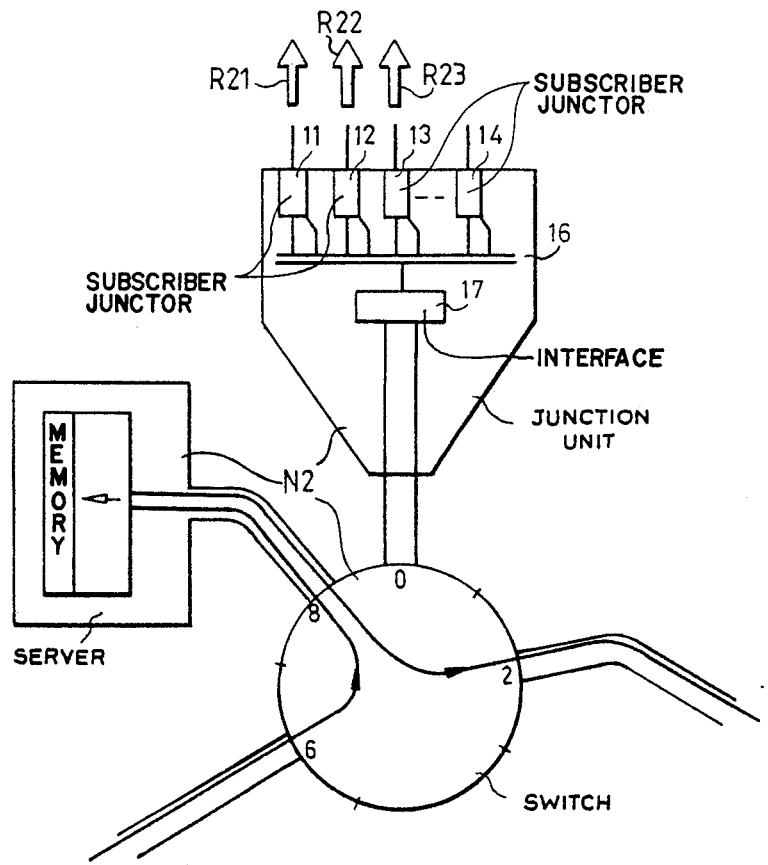
FIGS. 4, 5 and 6 shows more detailed diagrams of elements of FIG. 1 in the case of the use of packets according to FIG. 3.
Figure 5:
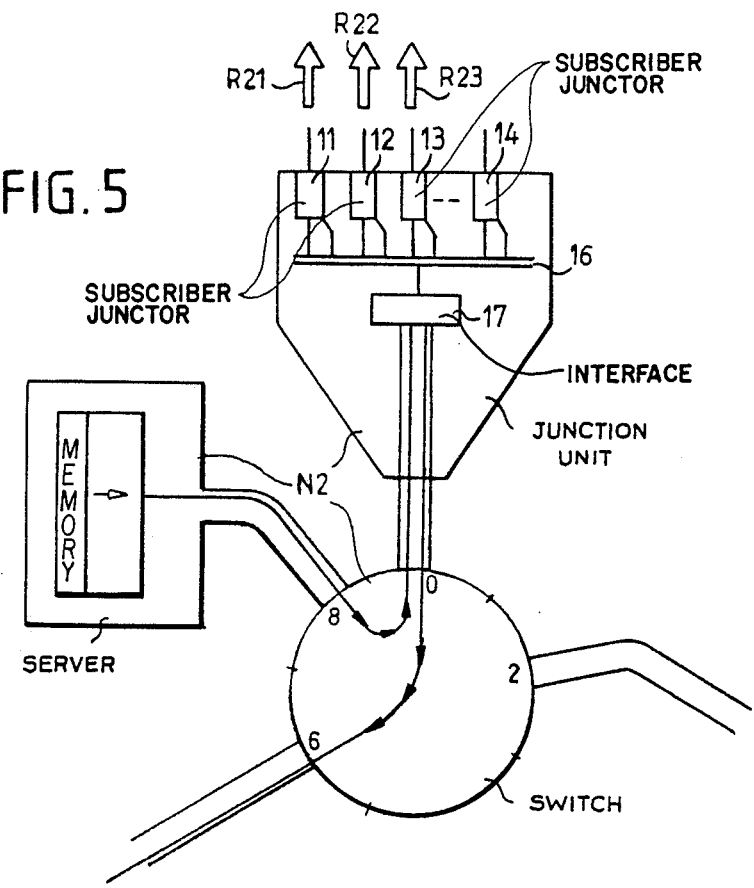

FIGS. 4 and 5, the description of which shall be resumed further below with respect to information exchanges, shows the node N2 of FIG. 1 in the case of the first embodiment.

The node has switch with its connection point 0 connected, by an artery, to a standard junction unit which successively comprises an interface 17, a bus 16 and various subscriber junctors. Some of these subscriber junctors, marked 11 to 13, are connected to subscribers R21, R22, R23, who are in the transmission list considered. The other subscriber junctors, such as 14, are connected to subscribers (not shown in FIG. 5) who are not in the transmission list considered. The switch of the node N2 has its connection points 2 and 6 respectively coupled by an artery to the node N3 of FIG. 1, and by another artery to the node N1 of FIG. 1. It has connection point 8 connected by an artery to the transmission server which has just been referred to above.

Figure 6:
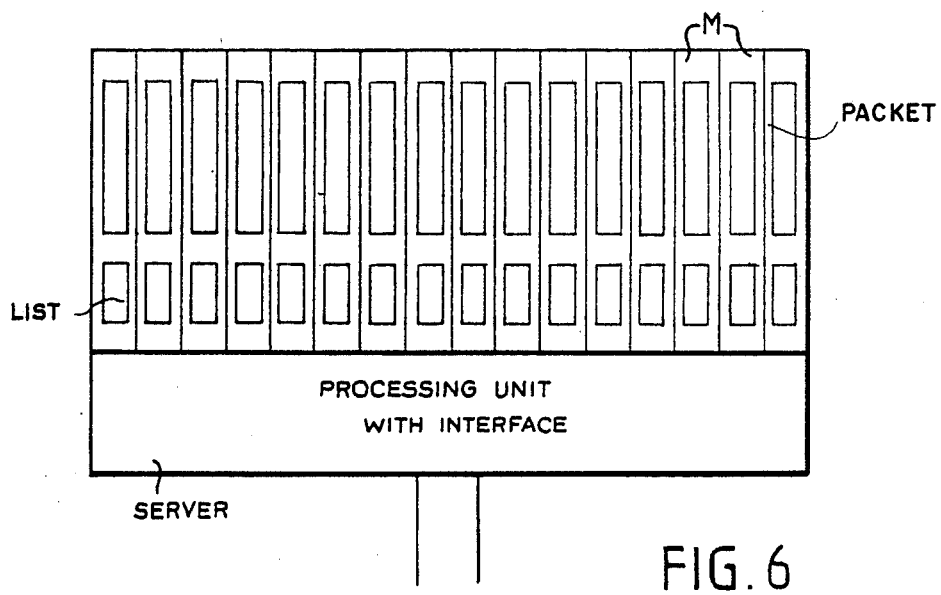

FIG. 6 is a more detailed view of the server of FIGS. 4 and 5. This server has a data processing unit with a connection circuit or interface connected to the artery coming from the connection point 0 of the switch. The server also has a set of memories, M, formed by the sixteen sub-servers mentioned above. Each sub-server has a packet memory zone and a list memory zone in which there are stored the addresses of the addressees of the packet in the node N2. The other nodes of the network are formed similarly.

Another look at FIG. 3 makes it possible to study the routing of a packet which contains the information emitted by the sender Ell of FIG. 1 and is designed to forward a message to the addressees.

FIG. 3a shows the packet when it reaches the switch of the node N1. It respectively comprises:

flags shown by hachured lines, an ordinary arrow marked "0,3" in FIG. 3a, which begins with a "0" and indicates, to the packet, the output point 3 of the switch of the node N1; this arrow is "plucked out" by this switch which then transmits the packet according to FIG. 3b, a transmission arrow, marked "1.0" in FIG. 3a, which is distinguished from the ordinary arrows by the fact that it starts with a "1" and which, when it reaches the switch of the node N2 where it is plucked out (FIG. 3c), indicates, to the packet, the connection point 8 of the switch to which the transmission server of FIGS. 4 to 6 is connected;

a transmission list marked "D1" in FIG. 3a indicates one among the sixteen sub-servers; this list is plucked out on its arrival in the processing unit of the server (3d);

an ordinary arrow, marked 0,2 in FIG. 3a, which indicates, to the packet, the connection point 2 of the switch of the node N2; this arrow is plucked out by this switch which transmits the packet according to FIG. 3e;

an ordinary arrow, marked "0,3" in FIG. 3a, which is plucked out by the switch of the node N3 (FIG. 3f), for which it indicates the connection point 3;

a transmission arrow, marked "1,0" in FIG. 3a, plucked out by the switch of the node N4 (FIG. 3g), for which it designates the connection point 8 to which is connected a transmission server similar to that of FIGS. 4 to 6;

a transmission list, marked "D2" in FIG. 3a, which designates, in the server of the node N4, one of the sixteen sub-servers, and is plucked out in the server (FIG. 3h);

an ordinary arrow, marked "0,0" in FIG. 3a, which designates the connection point 0 of the switch of the node N4 to which there is connected a junction unit similar to that of FIGS. 4 and 5;

a local address, which does not exist in the junction unit of the node N4, and which makes it possible to eliminate the packet which, as shall be seen from the following description, has given, by means of the transmission servers of the nodes N2 and N4, its message to the addressees R21 to R23 and R41, R42;

a control field which, as in a packet according to the prior art, indicates the protocol to be applied depending on the nature of the application;

a field of user data complemented, if necessary, with ancillary data, required by the protocol (order number, frame sequence, etc.);

flags shown by hachured lines.

To make it possible for the packet to be routed as just described and, at the same time, to enable the message of the packet to be sent to the addressees, the transmission server, such as that of FIGS. 4 and 6, performs the following tasks:

it receives the number of the sub-server and plucks it out;

it receives all the rest of the packet and stores it in the memory zone of the packet of the sub-server;

it emits arrowed packets;

the packet stored in the memory zone is emitted, via the switch, by the artery shown by the first arrow encountered; this first arrow is plucked out by the switch;

packets equal, in number, to the addressees, whose addresses are contained in the list memory zone of the sub-server; each of these packets has an arrow designating the artery connected to the connection point 0, one of the addresses contained in the list memory zone, the control field and a user data field; these packets reach the local addressees through the switch and the junction unit.

FIGS. 4 and 5 show the paths followed by these packets in the case of the node N2 of FIG. 1.

In FIG. 4, a black arrow is used to show that the packet coming from the sender through the connection point 6 reaches the server where it is stored in the memory, M, and retransmitted through the connection point 2 towards the node N3. In FIG. 5, three black arrows are used to show that the packets prepared in the server are transmitted, through the junction unit, to the addressees R21 to R23; in the example described, the addressees R21 to R23 emit acknowledgement packets towards the sender E11 of FIG. 1, through the connection point 6.

Figure 7:
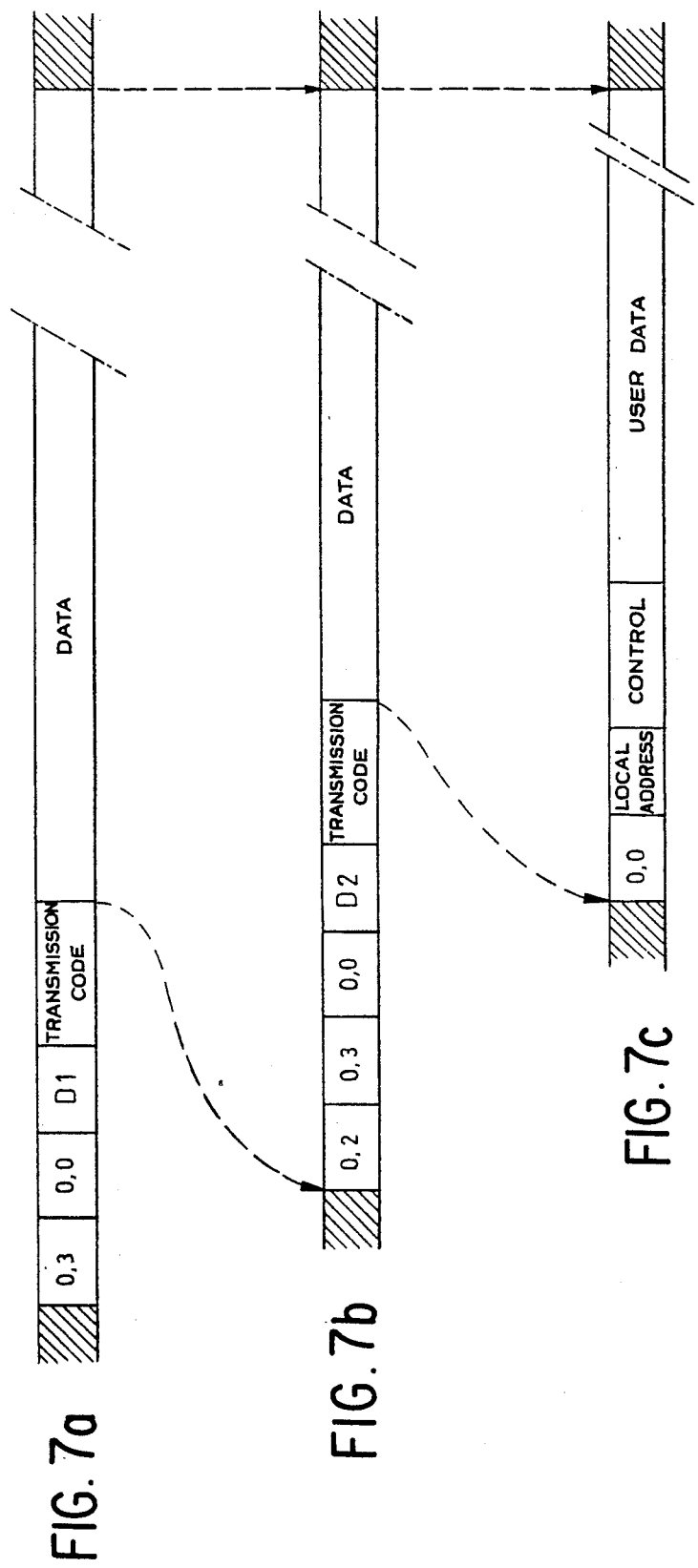
FIGS. 7a-7c show the successive structures of a second type of arrowed packet according to the invention.

FIG. 7, which is sub-divided into FIGS. 7a to 7c, shows the progress, in the second embodiment, of another type of packet designed for switching along a main trunk route. In this figure, the flags have been shown with hachured zones.

FIG. 7a to 7c show the information placed at the head of the packet at a given instant, to enable the transmission of the message.

Figure 8:
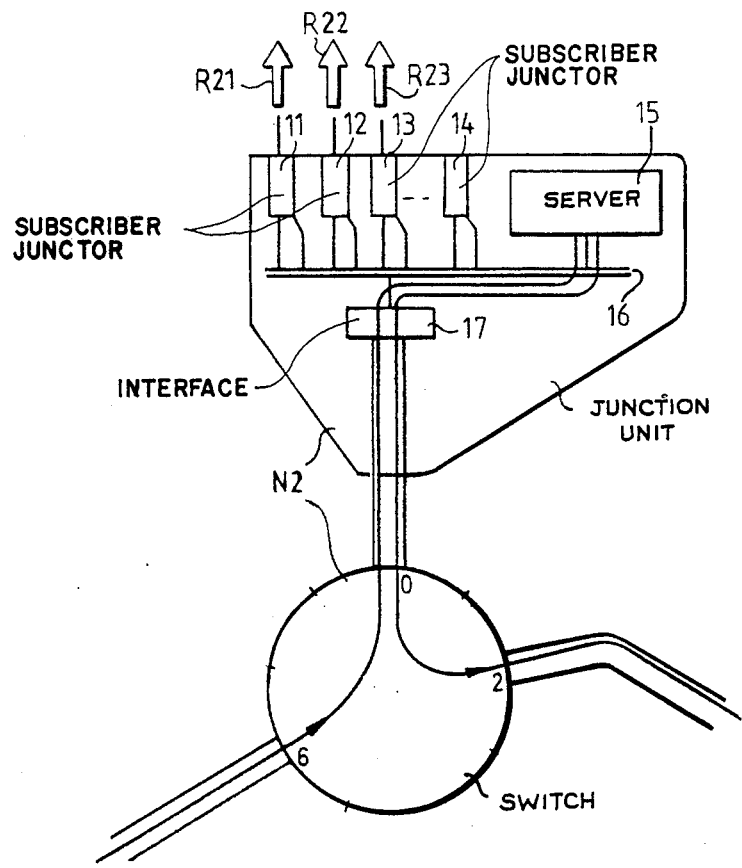
FIGS. 8 and 9 are more detailed drawings of elements of FIG. 1, in the case of the use of packets according to FIG. 7.
Figure 9:
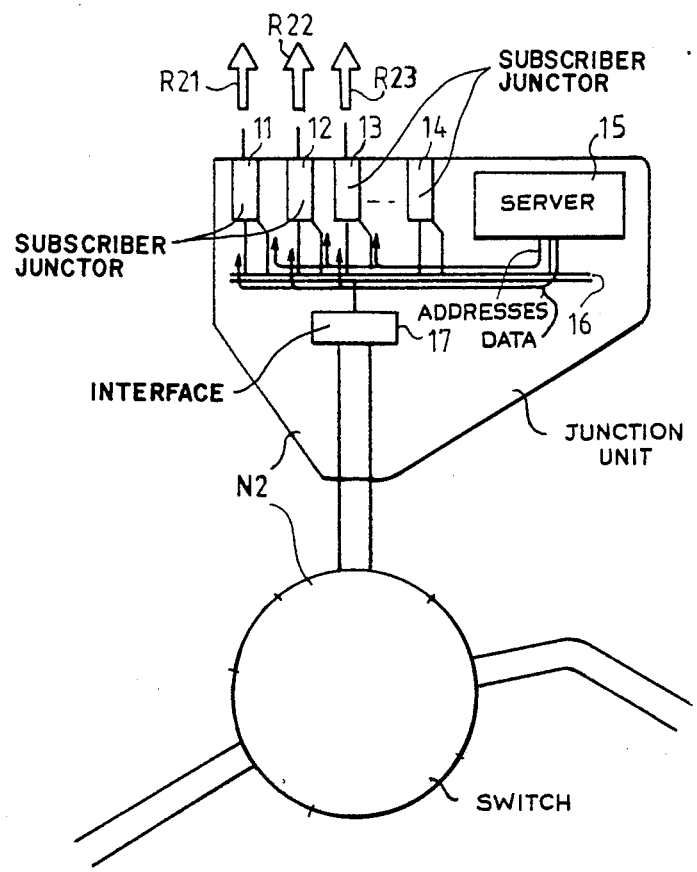

FIG. 7a represents the packet when it is being created by the sender E11 of FIG. 1. It has a header with the following successively:

an ordinary arrow, marked "3" in the figure, indicates, to the packet, the connection point 3 of the switch of the node 1; this arrow is plucked out by this switch; the packet is thus routed towards the switch of the node N2;

an ordinary arrow, marked "0", which indicates, to the packet, the connection point 0 of the switch of the node N2, which is plucked out by the switch of the node N2, and which enables the packet to be routed to a junction unit shown in FIGS. 8 and 9. This junction unit corresponds to the junction unit of FIGS. 4 and 5 with the additional integration of a transmission server 15 having a structure which is similar, except for the number of sub-servers (8 and not 16 in the example described), to that of the server according to FIG. 6, but having a slightly different role which shall be described in detail further below;

a local list D1, consisting of the same number n of binary figures as a local address, which designates one of the $2^n$ = eight sub-servers in the server of the junction unit of the node N2; these sub-servers, as in the previous embodiment, have a addressees list memory and a packet memory; the list memory contains, here again, the list of local addressees;

a transmission code which indicates that the protocol whose activation is requested is:

the transmission of the message to the local addressees; FIG. 7c will show the location of this message which is also called user data;

the emission of a new packet to the following step of the main trunk route, namely to the nodes N3 and then N4;

a data zone formed by the entire packet according to FIG. 7b, not including indicators; it is this zone that is stored in the memory of the packet of the above-mentioned sub-server.

FIG. 7b shows the packet when it will leave the node N2 to perform the node N2/node N4 step through the node N3. The header of this packet is similar to the header of the packet according to FIG. 7a, apart from the difference that it has an additional arrow, marked "G", to ensure the passage, without local transmission, from the node N3.

FIGS. 7c shows the packet which enables the complete unpackaging of the user data. This packet, which is formed by the entire zone of the data of the packet according to FIG. 7b, comprises :

an ordinary arrow "0";

a local address;

an application control zone which gives the protocol to be applied, i.e. it states how the message should be processed by the users, namely the addressees R21–R31, R41 and R42;

the user data, namely the message intended for all the addressees.

The transmission sub-server, designated by the "local list" thus has, available in its memory, the list of local addressees and the "data" zone (according to FIG. 7a for the node N2 or FIG. 7b for the node N4); its role is to send the entire packet to the network after having plucked out the local list and the "transmission code", namely, its role is to send the entire "data" zone to the network. The role of the sub-server is also to send the local addressees the application code and the user data which it recognizes through the fact that they are immediately behind an arrow "0" followed by a local address and a control code and no longer by the transmission code.

FIGS. 8 and 9 illustrate the role of the sub-server designated by the "local list" in the server 15. FIG. 8 shows the path taken by the packet reaching through the connection point 6 in the node N2 where it is taken into account by the server of the junction unit which transmits it back to the network by the connection point 2. FIG. 9 shows the dispatch, firstly, of the user data and, secondly, of the application control to the addressees designated by the local list of the sub-servers.

The invention is not restricted to the examples described. Thus, in the second embodiment, there may be provision, as shown in FIG. 5, within the scope of the first embodiment, for the emission of a acknowledgement packet. In the same way, packets of the type according to FIG. 3 may be used with servers located inside the junction unit, and packets according to FIG. 7 may be used with servers outside the junction unit. The modifications to be made to these packets relate simply to paths to be travelled by these packets and, hence, to the arrows which they should contain in order to have access to the servers, depending on the connection points to which they are connected. And, of course, one and the same network may have several different senders, each sender being capable of transmitting to different sets of addressees at its choice.

What is claimed is:

1. A method for switching of a data packet along a main trunk route of a communications network, comprising switch nodes, wherein said method uses an arrowed packet comprising ordinary node-to-node guiding arrows and consists in effecting, from certain nodes of the main trunk route, a local transmission of data from a subscriber towards addresses and, for this purpose, in placing, in the packet, after each of the ordinary arrows which make the packet reach a node where a local transmission of data towards the addresses has to be made, an other arrow and pieces of information, said other arrow designating a transmission server proper to the node to which the packet was made to reach by the ordinary arrow preceding said other arrow, and said pieces of information being of three types: a designation of a zone of the server containing a list of addresses, data to be sent to the addresses and a protocol for the use of this data.

2. A device for the implementation of a method of data packet along a main trunk route of a communications network, comprising switch nodes, wherein said method uses an arrowed packet comprising ordinary node-to-node guiding arrows and consists in effecting, from certain nodes of the main trunk route, a local transmission of data from a subscriber towards addressees and, for this purpose, in placing, in the packet, after each of the ordinary arrows which make the packet reach a node where a local transmission of data towards the addressees has to be made, an other arrow and pieces of information, said other arrow designating a transmission server proper to the node to which the packet was made to reach by the ordinary arrow preceding said other arrow, and said pieces of information being of three types: a designation of a zone of the server containing a list of addressees, data to be sent to the addressees and a protocol for the use of this data, said device comprising said switch nodes, each of said nodes being provided with a switch with connection points and, at least in each of said nodes where a local transmission has to be made, being further provided with a transmission server associated with a junction unit, coupled with one of the connection points of the switch of that node and comprising pre-established lists of local addressees, said server including senders to prepare packets comprising a sequence of arrows, some of which are said ordinary node-to-node guiding arrows while others, placed just after one of said ordinary arrows designating a node wherein a transmission has to be made, designates the connection point to which the server of the designated node is coupled, and comprising, just after said arrow designating a connection point, said designated zone to designate one of the pre-established lists in this server.

3. A device according to claim 2, wherein the junction unit and server relative to one of the nodes are coupled to two distinct connection points of the switch of the node.

* * * * *